United States Patent [19]

Guillou

[11] 4,337,483
[45] Jun. 29, 1982

[54] TEXT VIDEO-TRANSMISSION SYSTEM PROVIDED WITH MEANS FOR CONTROLLING ACCESS TO THE INFORMATION

[75] Inventor: Louis C. Guillou, Bourgbarre-Saint Erblon, France

[73] Assignees: Etablissement Public de Diffusion dit "Telediffusion de France", Montrouge; L'Etat Francais, represente par le Secretaire d'Etat aux Poste et Telecommunications (Centre National d'Etudes des Telecommunications), Issy les Moulineaux, both of France

[21] Appl. No.: 117,234

[22] Filed: Jan. 31, 1980

[30] Foreign Application Priority Data

Feb. 6, 1979 [FR] France .............................. 79 02994

[51] Int. Cl.³ .................. H04N 7/16; H04K 1/00
[52] U.S. Cl. ................................ 358/114; 340/706; 358/147; 340/825.54; 340/825.5
[58] Field of Search ..................... 455/2; 358/86, 114; 340/147 LP, 149 A, 149 R, 152 R, 152 T, 706; 178/22.08

[56] References Cited

U.S. PATENT DOCUMENTS 3,934,079 1/1976 Barnhart .............................. 358/86
3,956,615 5/1976 Anderson et al. ............... 340/152 R
3,997,718 12/1976 Ricketts ................................ 455/2
4,081,132 3/1978 Sherman ............................ 358/122
4,214,230 7/1980 Fak et al. ......................... 340/149 A Primary Examiner—Howard A. Birmiel

[57] ABSTRACT

A text video-transmission system comprising an information emitting center and receiving stations, the emitting center comprising encryption means using an operating key, each receiving station comprising decryption means using the operating key, wherein in this system, the encryption means of the emitting center comprise: a generator delivering a numerical signal representing an operating key K, this key changing randomly at predetermined intervals; an automatic encryption means comprising: a discriminator with an input connected to a magazine memorizing circuit from which it receives clear octets, this discriminator being capable of distinguishing, among these clear octets, those wherein the 7th and 6th binary elements are zero, an OR-exclusive logic circuit connected to the discriminator from which it receives octets wherein the 6th and/or 7th binary elements are not zero, this logic circuit having an output which carries encrypted octets; a generator of encoding octets, the decoding means of each receiving station comprising: a generator of a numerical signal representing the operating key K in use in the emitting center, automatic decryption means comprising: a discriminator adapted to distinguish, among the encrypted octets, those wherein the 7th and 6th binary elements are zero, an OR-exclusive logic circuit connected to the discriminator; and a generator for decoding octets.

11 Claims, 10 Drawing Figures

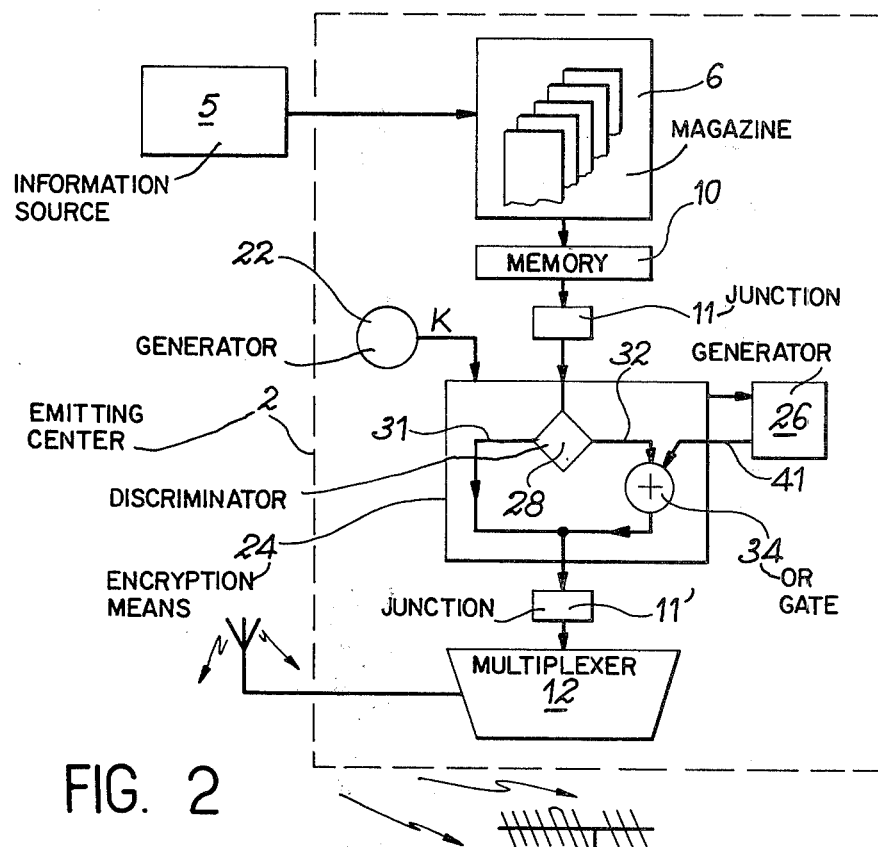
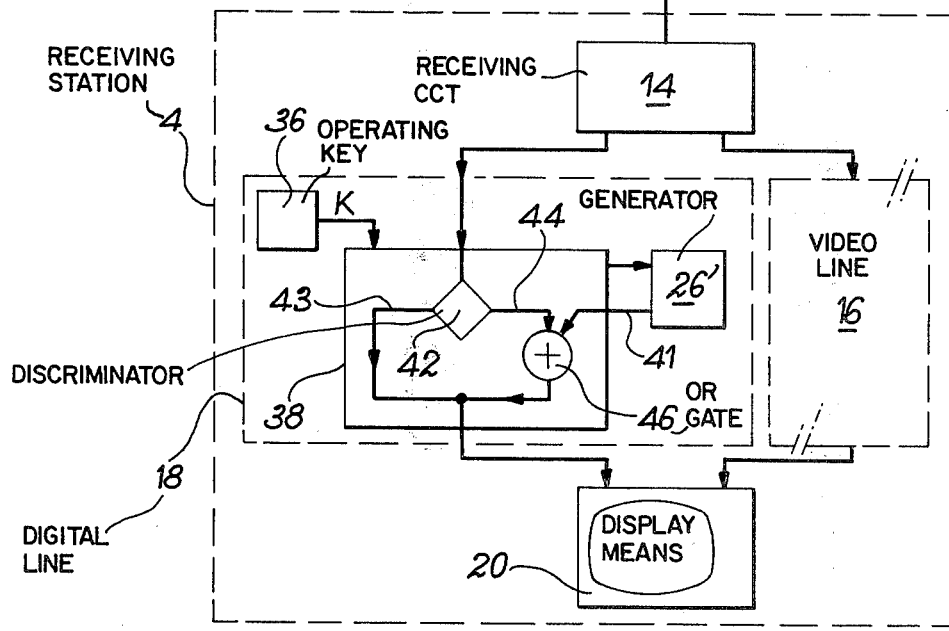
FIG. 2

TEXT VIDEO-TRANSMISSION SYSTEM PROVIDED WITH MEANS FOR CONTROLLING ACCESS TO THE INFORMATION

BACKGROUND OF THE INVENTION

The present invention relates to a text video-transmission system provided with means for controlling access to the information.

It can be used in the transmission and display of information on television receivers for purposes of entertainment, information or education. The invention applies essentially to a broadcase system (i.e. unidirectional) by means of which alphanumerical information organised into pages and magazines can be put into television lines and to interactive system (i.e. two-directional) affording access to data bases (general information, directories, etc.) and to interactive services (transactions, messages, education) through the telephone system.

In the first system, the distribution of information is effected by a method of distribution in bundles, compatible with the distribution of the television signal.

These systems have already been described in numerous articles or patent applications. Reference is made hereinafter essentially to the so-called ANTIOPE system, a detailed description of which can be found particularly in the following documents:

the article by Y. GUINET entitled: "Etude comparative des systèmes de télétexte en radiodiffusion. Quelques avantages de la diffusion des donnees par paquets appliquee au teletexte" which appeared in the U.E.R. Cahier Technique, no. 165, October 1977, pages 242 to 253;

the article by B. MARTI and M. MAUDUIT entitled "ANTIOPE, service de télétexte", which appeared in the journal "Radiodiffusion Télévision", 9th year, no. 40. November-December 1975, 5/5, pages 18 to 23;

the "Spécification du Système de télétexte ANTIOPE", edited by the Centre Commun d'Etudes de Télévision et Télécommunications (CCETT);

French patent application no. 75 18319, filed on June 6th 1975 and entitled "Data distribution system";

French patent application Peg. no. 76 27212, filed on Sept. 6th 1976 and entitled "System for the numerical transmission and displaying of text on a television screen";

French patent application no. 76 29034, filed on Sept. 22nd 1976 and entitled "Improvements to systems for the numerical transmission and displaying of texts on a television screen";

the French application for a certificate of addition no. 77 17625, filed on June 3rd 1977 and entitled "Data distribution system".

As this video-transmission system is thus widely known, it will not be described in detail here. Only the essential principles will be mentioned, to make the invention easier to understand. For any details of design or construction, reference can be made to the documents cited above which in turn refer to others, and all these documents should be regarded as incorporated in this description.

FIG. 1 shows, in highly diagrammatic form, the essential elements of such a system. Such a system comprises an emitting centre 2 and receiving stations 4, 4', etc.

The emitting centre receives information from one or more sources 5 and comprises:

means 6 for composing a magazine consisting of pages organised into lines of characters, if the supplier of the information has not already composed it in this way;

a magazine memorising circuit 10 in the form of numerical signals grouped into octets (8 binary elements);

a junction 11 connected to the circuit 10, a distribution multiplexer 12 serving to form bundles of octets and insert information in the lines of a television signal, this device using the procedure mentioned above.

Each receiving station comprises:

a circuit 14 for receiving and demodulating said television signal;

a line 16 for processing the video picture signals;

a line 18 for processing numerical signals, this line comprising notably a numerical data decoder, and finally display means 20.

In a system of this kind, the flux of information from the suppliers of information to the distribution centres has the following general characteristics.

The source 5, which is an information-supplying data bank, is, for example, a meteorological service, the Stock Exchange, an information agency, etc. This bank supplies the composing means 6 which puts the information into pages of the suitable format.

To indicate the size scales involved, it can be stated that, in the case of an experimental magazine produced for share values, there may be about 80 pages containing on average 800 octets, i.e. a total of 64000 octets. A shares magazine of this kind uses a resource of 10 lines per frame. A television line lasts 64 $\mu$s and can carry 32 useful octets, and there are 50 frames per second. Thus, the resource of a line/frame makes it possible to transmit $50 \times 32 \times 8 = 12800$ b/s (binary elements per second). The entire magazine is thus transmitted in $$\frac{64 \times 8}{12.8 \times 10} = 4 \text{ seconds,}$$

which means that the magazine is transmitted cyclically with a periodicity of 4 seconds.

It will be noted that an interactive line connecting the distribution centre to the information supplier typically operates at 4800 b/s and this difference in speed relative to the speed of broadcasting at 12800 b/s explains the need to memorise the information at the distribution source.

In such system, the octets carrying the information are traditionally marked as follows:

| | j | k |
|---|---|---|
| $b_8$ | $\overbrace{b_7\ b_6\ b_5}$ | $\overbrace{b_4\ b_3\ b_2\ b_1}$ |
| Odd-numbered | High weight | Low weight | wherein the binary element $b_8$ is an odd-numbered element, in other words an element wherein the total number of "1" appearing in the octet is odd.

Thus, according to this notation, the octet $(j/k)=(4/7)$ corresponds to the octet 11000111.

The octets are divided into control octets and data octets. The control octets indicate, in particular, the beginnings and ends of pages and the beginnings and ends of lines. The data octets, inserted between the control octets, correspond to the characters contained in the lines. All these octets, both control and data octets, comprise a heavy weight binary element which is an odd-numbered element.

All the codes, identified by such octets, are organised into a table as follows:

|       |       |       |       |   | $b_7$ | 0 | 0 | 0 | 0 | 1 | 1 | 1 | 1 |
|-------|-------|-------|-------|---|-------|---|---|---|---|---|---|---|---|
|       |       |       |       |   | $b_6$ | 0 | 0 | 1 | 1 | 0 | 0 | 1 | 1 |
|       |       |       |       |   | $b_5$ | 0 | 1 | 0 | 1 | 0 | 1 | 0 | 1 |
| $b_4$ | $b_3$ | $b_2$ | $b_1$ | k | j     | 0 | 1 | 2 | 3 | 4 | 5 | 6 | 7 |
| 0 | 0 | 0 | 0 | 0 |  |  |  |  |  |  |  |  |  |
| 0 | 0 | 0 | 1 | 1 |  |  |  |  |  |  |  |  |  |
| 0 | 0 | 1 | 0 | 2 |  |  |  |  |  |  |  |  |  |
| 0 | 0 | 1 | 1 | 3 |  |  |  |  |  |  |  |  |  |
| 0 | 1 | 0 | 0 | 4 |  |  |  |  |  |  |  |  |  |
| 1 | 1 | 1 | 1 | 15 |  |  |  |  |  |  |  |  |  |

In this table, the columns 0 and 1 which correspond to the octets wherein the 6th and 7th binary elements are zero ($b_6 = b_7 = 0$), contain control octets;

columns 2 and 3 contain essentially numbers and punctuation marks;

columns 4 and 5 contain essentially capital letters, columns 6 and 7 chiefly contain lower case letters.

As an example, a current page of information accessible to the user is in the following form:

(1) First, it contains a page heading, which is made up of the control codes (ETX) FF RS $NP_1$ $NP_2$ $NP_3$: wherein:

ETX is a code which terminates the preceding page,

FF is a code indicating a new page,

RS is a page flag, $NP_1$, $NP_2$, $NP_3$ are codes indicating a page number from 001 to 999.

(2) After the page heading there is a "zero" line: US 00 $C_1$ $C_2$ $C_3$ . . . . . . . . RC LF, wherein:

US is a line flag, 00 indicates the zero line, $C_1$, $C_2$, $C_3$ are supplementary codes, RC LF terminate the line.

The zero line may also contain an operating name, a date, a time and optionally information on charges. This zero line does not carry any information which constitutes the service. It is part of the procedure.

(3) After the zero line come the information lines comprising first of all a line heading which is made up of the codes (RC LF) US $NR_1$ $NR_2$, wherein:

RC LF terminate the previous line,

US is a line flag, $NR_1$ $NR_2$ constitute the line number, which goes from 01 to 24.

Then come the data octets $d_1$, $d_2$ . . . $d_n$. These octets are inserted between the start of the current line and either a line end—start of new line - or the end of a page. These octets $d_1$, $d_2$, . . . $d_n$ represent the information constituting the service being broadcast. Thus the information element in a system of this kind is the displayable line.

There are also other pages in addition to these current pages of information. They are functionally accessible by means of the supplementary codes $C_1$, $C_2$, $C_3$ contained in the zero line. These are, for example, cover sheets and warning pages. All these pages are part of the procedure. Finally, there is a page of summary which can be regarded as part of the data.

Now that these points regarding the general system have been mentioned, we can deal with the problem which the invention sets out to solve.

The advent of the new services above mentioned raises the question of how to charge for them, i.e. how to implement a system for identifying and controlling the audiences. This question arises more generally for any broadcast service which tends to make the broadcasting networks more profitable by making better use of the resources.

Taxation of the subscription type constitutes a both flexible and durable relationship between a service and its users. Such a method of taxation is particularly justified in broadcasting.

Taxation of the type based on consumption may also be used; this method of taxation is fundamental for "interactive" systems (where there is a dialogue between the subscriber and the information source; however, it is of secondary value in broadcasting systems (in which information is transmitted in one direction to the subscribers).

There may be intermediate systems known as "quasi-interactive" systems wherein the content of the distribution source is continuously modified to meet the requirements of the users, which are transmitted via a public data network. The advent of new distribution means with a very large capacity, such as satellites, will develop this quasi-interactive mode considerably, thus making it necessary to implement a system for controlling access to the information provided.

This problem of access control raises above all the problems of encrypting the information when it is broadcast and decrypting when it is received. Naturally, these problems must be resolved in accordance with the specificity of the teletext system which is to be controlled. In particular, the method of scrambling the information and restoring the intelligibility of the information should not harm the performance of the system.

Now, it is known that messages translated into the suitable language are characterised by a substantial redundancy so that the incidence of transmission errors on the intelligibility of the information broadcast is minimised. Thus, alphabetic texts are intrinsically very redundant, as are the majority of semi-graphic drawings; the character display controls use escapement characters; the page and line numbering uses Hamming codes; all the octets constituting a magazine are transmitted with imparity, etc. . . . Thus, there is no attempt to compress the information and the method of recovering the intelligibility of the information must therefore respect this redundancy and not propagate the deleterious consequences of transmission errors, which are difficult to monitor in broadcasting.

The means for recovering the intelligibility of information which has been locked up beforehand constitute, to some extent, an "electronic lock", and the intelligibility of the locked up information can only be recovered by the use of a suitable key.

The first question which arises is therefore the room to be allotted to this electronic lock in the system to be monitored. In fact, in the case of the teletext system, two procedures are used: the transporting procedure and the operating procedure. At what level of the procedure should this lock be placed?

BRIEF SUMMARY OF THE INVENTION

The invention answers this question by proposing a lock which is attached to the operating level. This method has a number of advantages. First, it respects all the constraints of synchronisation and non-propagation of the transmission errors. Furthermore, it is independent of the transporting network used by the system. Finally, it does not require any adjustment of the existing standards and will accommodate any future development of these standards.

In other words, and according to a first feature of the invention, the encryption of the information constituting a magazine is carried out at the distribution source. More precisely, the encryption means are located upstream of the multiplexer, which has reference numeral 12 in the plan in FIG. 1.

Now that room has been found for the encryption means, there is still the question of the object to which these means are applied.

The invention answers this second question by proposing means whose function is to encrypt up only the information carried in the displayable lines of the ordinary pages of the magazine. In other words, the encryption does not affect the control codes appearing in columns 0 and 1 of the table of codes given hereinbefore and, in particular, the codes ETX, FF, RS, RC, LF and US. It affects only the data codes $d_1$, $d_2$, etc. This is the second feature of the invention.

Finally, the invention sets out to solve a third problem, that of respecting the imparity of the octets broadcast.

All these aims are achieved by the use, according to the invention, of automatic encryption means which comprise means for forming a succession of encoding octets wherein the binary elements marked $c_1$ to $c_8$ are generated as follows:

$c_1$, $c_2$, $c_3$, $c_4$ and $c_5$ are taken at the output of a pseudo-random series generator which is reset at the start of each displayable line by an operating key K and by the page and line numbers in question;

$c_6$ and $c_7$ are at zero, and $c_8$ is an even-numbered element.

Thus, the coding series obtained is made up of even octets. These octets are marked $C_1, C_2 \ldots C_n$ or, generically, $C_j$. The clear octets constituting a line of information form a series marked $d_1, d_2 \ldots d_n$ or, generically, $d_j$. These octets are odd-numbered and are locked up by the encoding octets in accordance with the following rules:

At each new clear octet of the displayable line, an octet is taken from the encoding series. There are two possibilities:

If the clear octet belongs to columns 0 and 1 of the table of codes ($b_6 = b_7 = 0$) the clear octet is transmitted as it stands, and the encoding octet is not used;

If the clear octet does not belong to column 0 or 1, then the clear octet and the encoding octet are combined by an "OR-exclusive" logic circuit to form a broadcast octet: $D_j = d_j \oplus C_j$, where the symbol $\oplus$ represents the "OR-exclusive" logic operation.

Because of the parity of the encoding octets, the broadcast octets are odd, like the clear octets, thus satisfying the requirement mentioned above.

Moreover, the "OR-exclusive" operation is manifested by the substitution of the clear octet by a broadcast octet belonging to the same group of columns as the clear octet, namely:

the group of columns 2 and 2 which contains essentially the numbers and punctuation marks, the group of columns 4 and 5 which contains mainly capital letters, and the group of columns 6 and 7 which contains mainly lower case letters.

Finally, the octets belonging to columns 0 and 1 are not modified, particularly the octets corresponding to the codes ETX, FF, RS, RC, LF and US, which are transmitted as they stand. Moreover, owing to the fact that the 6th and 7th binary elements of the encoding octets are zero, no new octets belonging to these columns are introduced. Thus the desired transparency is ensured.

In this way, all the aims listed above are attained with the locking means used according to the invention.

To reinforce the inviolability of the lock thus formed, the operating key K is advantageously modified at random at predetermined, relatively short intervals (of the order of a few minutes, for example).

It then remains to decrypt the information when it is received. To do this, the receiver should comprise a generator of decoding octets which delivers octets formed as follows:

the low weight 5th binary elements are taken from a quasi-random series obtained from a generator reset at each start of a line by the operating key K, by the page and line numbers in question;

the 6th and 7th binary elements are zero, and the 8th binary element is forced to zero.

The rules for decryption are analogous to the rules for encryption; at each new octet received, belonging to an encrypted line, a new decoding octet is generated. There are two possibilities:

If the octet received belongs to columns 0 and 1, it is transmitted as it stands to the interpreting circuits;

If the octet received does not belong to columns 0 and 1 (because its 6th and/or 7th binary elements are not zero) it is combined by an OR-exclusive circuit with the decoding octet before interpretation is carried out.

Interpretation of the language is thus closely interconnected to the encryption of the lines of information, and the robustness of the structure of the language broadcast is not affected by the encryption operations.

Now that these general comments have been made regarding the invention, the precise definition of the object of the invention can then be worded as follows:

Transmission system comprising an information emitting centre and receiving stations, the emission centre comprising:

means 6 for composing a magazine consisting of pages organised into lines of characters, if such means are not already contained in the information source, a circuit 10 for memorising the magazine in the form of numerical signals grouped in octets (8 binary elements), these octets comprising control octets and data octets, the control octets indicating in particular the beginnings and ends of pages and the beginnings and ends of lines, the data octets corresponding to the characters contained in each line, all these control and data octets comprising a binary element of high weight which is an odd-numbered element, the octets wherein the 6th and 7th binary elements are zero being control octets, a junction 11 connected to the circuit 10, and a distribution multiplexer 12 serving to insert information in the lines of a television signal, this emitting centre also comprising means for encoding the information using an operating key, each receiving station comprising:

a circuit 14 for receiving and demodulating said television signal, a line 16 for processing the video picture signals, a line 18 for processing numerical signals, containing in particular a numerical signal decoder, and display means 20, each receiving station further comprising means for decoding the coded information using said operating key, the system being characterised in that:

(A) the encoding means of the emission centre comprise:

(a) a generator 22 delivering a numerical signal representing an operating key K, this key changing randomly at predetermined intervals, (b) automatic encryption means 24 comprising:

(i) a discriminator with an input connected to the magazine memorising circuit from which it receives clear octets, this discriminator being adapted to distinguish, among these clear octets, those wherein the 7th and 6th binary elements are zero, this discriminator having two outputs, the first carrying these octets wherein the 7th and 6th binary elements are zero, and connected to the distribution multiplexer through the junction, and the second carrying the clear octets $d_j$ wherein the 7th and/or 6th binary elements are not zero, (ii) an OR-exclusive logic circuit with two inputs, one of which is connected to the second output of the discriminator from which it receives the clear octets $d_j$ wherein the 6th and/or 7th binary elements are not zero, this logic circuit having an output which carries odd-numbered coded octets $D_j$, the coded octets then being directed towards the distribution multiplexer through the junction;

(c) a generator of encoding octets controlled by the automatic encryption means from which it receives octets indicating the page and line numbers of the data to be transmitted and the signal corresponding to the operating key, this generator of octets delivering, for each data octet $d_j$ of a displayable line, an encrypted octet $C_j$, this octet having an even-numbered 8th binary element and 7th and 6th binary elements of zero, this octet being applied to the other input of the logic circuit, (B) the decoding means of each receiving station comprise:

(d) a generator of a numerical signal representing the current operating key K in the emitting centre, (e) automatic decryption means comprising:

(i) a discriminator with an input connected to the numerical signal decoder of the receiving station, from which it receives the coded octets, this discriminator being adapted to distinguish, among these coded octets, those wherein the 7th and 6th binary elements are zero, this discriminator having two outputs, the first carrying these octets wherein the 7th and 6th binary elements are zero, this first output being directly connected to the display means, the second carrying the coded octets $D_j$ wherein the 7th and/or 6th binary elements are not zero, (ii) an OR-exclusive logic circuit with two inputs, one connected to the second output of the discriminator from which it receives the coded octets $D_j$, this logic circuit having an output which carries decoded octets $d_j$ which are then directed towards the display means;

(f) a generator of decoding octets controlled by the automatic decryption means which transmits to it the octets indicating the page and line numbers of the data transmitted and the signal corresponding to the current operating key K, this generator of decoding octets having an output which delivers, for each encrypted octet received, a decoding octet $C_j$ having a high weight binary element which is forced to zero and 7th and 6th binary elements of zero.

Encryption and decryption means of this kind provide an advantageous solution to the problem of charging mentioned hereinbefore. For this purpose, the invention proposes that in addition to the operating key whose function has been defined above, subscribers' keys should be used, which are generated randomly by a charge administration centre. These keys have a relatively long service life (from 1 to 12 months), compared with the operating key (which is of the order of a few minutes).

To illustrate the functioning of this double key system, one could take the example of a subscription plan using four types of subscription: 1 month, 3 months, 6 months and one year. In addition to its duration, a subscription is characterised by the month in which it begins. With a plan of this kind, in a given month and for a given service, there are thus 22 subscribers' keys liable to be used by the users: a monthly key, three three-monthly keys, six six-monthly keys and twelve yearly keys.

Each month, the charge administration centre provides each distribution centre with a list of 22 subscribers' keys in use for each service distributed by this centre. It also provides the subscription sales points with another list of 4 keys which are to start in the following month (one month, three months, six months and a year), for each service, with the prices of the subscriptions.

A suitable machine installed in each sales point records some of these keys, in the form of subscription blocks, on holders provided for this purpose (for example, information-bearing cards of the credit card type). These cards are then inserted by the users of the service in the receiver.

For each chargeable service, approximately every five minutes, a new operating key K is generated at random, by each distribution centre concerned. Thus, in the course of a session of a service (one or more hours), several dozen operating keys may succeed one another.

As soon as a distribution centre generates a new operating key K, it calculates, for each current subscribers' key in use $C_i$ for this service, a message $M_i$ by means of an algorithm $M_i = F_{C_i}(K)$, with the keys $C_i$ acting as parameters.

Thus, for a service using the subscription plan described above, there are 22 different messages in force at any one time. The duration of a message is equal to that of the operating key K, and for a given service, at any one time, there are as many messages as there are subscribers' keys in use.

All the messages $M_i$ in force together constitute the information for access control associated with the service being broadcast. This access control information is obviously not locked up by the electronic lock.

A particular application of this system is envisaged within the scope of the present invention. In this instance, the messages $M_i$ are grouped in a special page, known as the access control page, which is updated each time the operating key is changed. The access control page is distributed cyclically, like the ordinary pages of information constituting the service. However, it is not locked up by the electronic lock. The access control page is read systematically by the receiver when it is put into contact with the service, then each time this page is updated, during the period of consultation of the service, but it is not displayable.

The messages are therefore, in fact, motifs of primary synchronisation of the lock and these motifs can be interpreted by an algorithm supplying the operating key. This algorithm is in the form: $K = G_{C_i}(M_i)$, and is developed by a restoring circuit (which may also be part of the subscription holder which already contains the subscribers' key $C_i$) to which the messages $M_i$ are supplied. This circuit therefore provides the automatic unlocking means with the operating key K which enables it to unlock the information received.

BRIEF DESCRIPTION OF THE DRAWINGS

In any case, the features and advantages of this invention will become more apparent from the following description of some exemplary embodiments given by way of explanation and not in a restrictive capacity. This description refers to the accompanying drawings, wherein:

FIG. 2 shows a synoptic plan of a system according to the invention;

DETAILED DESCRIPTION OF THE PREFERRED EMBODIMENTS

Figure 1:
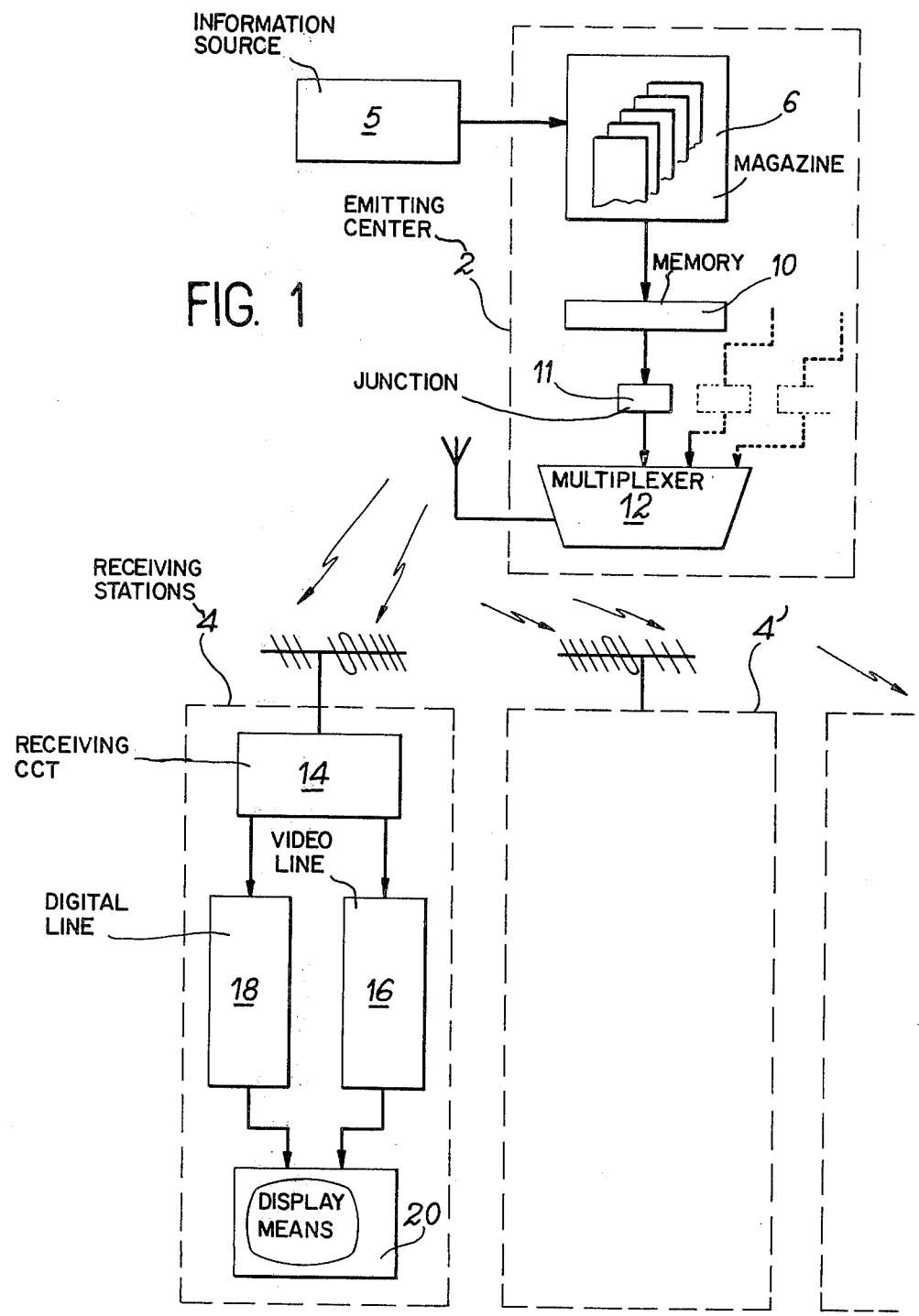
FIG. 1, already described, shows a synoptic plan of transmission system according to the prior art.

The system of the invention, in the form which it takes in the case of pages broadcasting system, is shown in the plan in FIG. 2. This system comprises known elements already shown in FIG. 1, namely:

in the emitting centre 2:

means 6 for setting up a magazine consisting of pages organised into lines of characters, unless such means are already provided in the information source, a circuit 10 for memorising the magazine in the form of numerical signals, a plurality of junctions 11 connected to the circuit 10, and a distribution multiplexer 12 serving to insert the information in the lines of a television signal, in each receiving station 4:

a circuit 14 for receiving and demodulating said television signal, a line 16 for processing the videopicture signals, a line 18 for processing numerical signals containing, in particular, a numerical signal decoder, and display means 20.

According to the invention, the system also comprises:

(A) in the emitting centre 2:

(a) a generator 22 delivering a numerical signal representing an operating key K, this key changing randomly at predetermined intervals which are, for example, of the order of a few minutes;

(b) automatic encryption means 24 comprising:

(i) a discriminator 28 with an input connected to the magazine memorising circuit 10 from which it receives clear octets; this discriminator is adapted to distinguish, among these clear octets, those wherein the 7th and 6th binary elements are zero; this discriminator has two outputs 31 and 32, the first carrying these octets wherein the 7th and 6th binary elements are zero and connected to the distribution multiplexer 12 (through a junction 11'), and the second carrying the clear octets $d_j$ wherein the 7th and/or 6th binary elements are not zero;

(ii) a logic circuit 34 of the OR-exclusive type with two inputs, one connected to the second output 32 of the discriminator 28 from which it receives the clear octets $d_j$ wherein the 6th and 7th binary elements are not zero; this logic circuit has an output which carries odd-numbered encrypted octets $D_j$, the encrypted octets then being directed (through junction 11') towards the distribution multiplexer 12;

(c) a generator 26 of encoding octets $C_j$, controlled by the automatic means 24 from which it receives octets indicating the page and line numbers of the data to be transmitted and the signal corresponding to the operating key K; this generator of octets 26 delivers, for each data octet $d_j$ of a displayable line, an encoding octet $C_j$, this octet having an even-numbered 8th binary element and 7th and 6th binary elements of zero, this octet being applied to the second input of the gate 34.

(B) in each receiving station 4:

(d) a circuit 36 delivering a numerical signal representing the operating key K in use in the emitting station, (e) automatic decryption means 38 comprising:

(i) a discriminator 42 with an input receiving the encrypted octets; this discriminator is adapted to distinguish, among these coded octets, those wherein the 7th and 6th binary elements are zero, this discriminator having two outputs 43 and 44, the first carrying these octets wherein the 7th and 6th binary elements are zero, this first output being connected to the display means 20, the second carrying the coded octets $D_j$ wherein the 7th and/or 6th binary elements are not zero, (ii) a logic circuit 46 of the OR-exclusive type with two inputs, one connected to the output 44 of the discriminator from which it receives the coded octets $D_j$, this logic circuit having an output which carries decoded octets $d_j$, which are then directed towards the display means 20;

(f) a generator 26' of decoding octets, controlled by the automatic decryption means, from which it receives the octets indicating the page numbers, the line numbers of the data transmitted and the signal corresponding to the operating key K in use; this generator of decoding octets has an output 41 which delivers, for each encoded octet received, a decoding octet $C_j$ having a binary element of high weight which is forced to zero and 7th and 6th binary elements of zero, these octets being applied to the second input of the gate 46.

The various components of this apparatus will now be described in detail, starting with the generators of coding octets 26 and decoding octets 26', which are in any case virtually identical.

The generator of encoding (or decoding octets) uses a pseudo-random series generator, which may be one of various types. For example, a block coding circuit mounted in quasi-synchronous mode may be used. For this purpose, the algorithm known as "D.E.S." (Data Encryption Standard) described in U.S. Department of Commerce, NBS, FIPS, PUB 46, Jan. 15th 1977 can be used.

Figure 3:
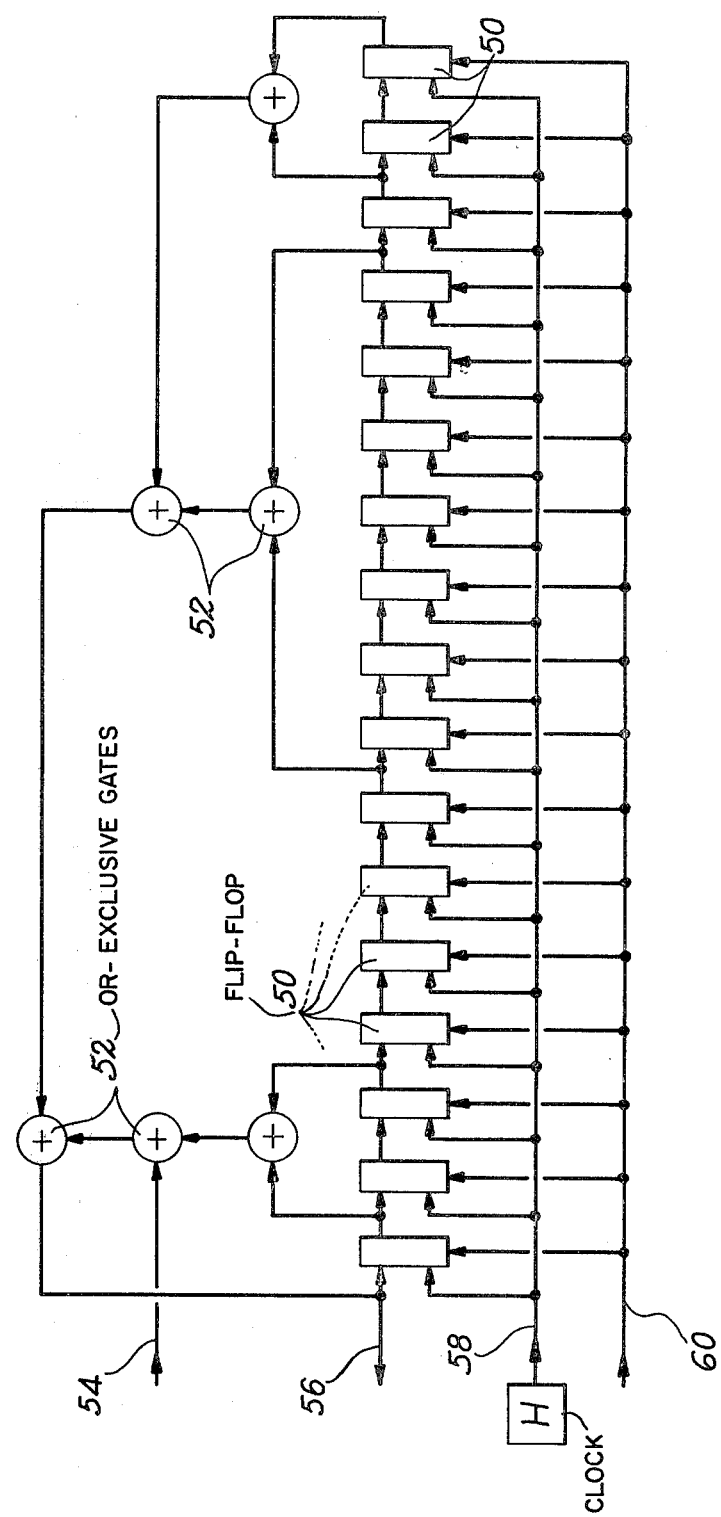
FIG. 3 shows a plan of a circuit for obtaining a particular primitive generating polynomial.

However, it is also possible to generate a pseudo-random series of this kind by means of generating polynomials combined by non-linear logic, and this is the particular case which is now described with reference to FIGS. 3 and 4.

First of all, some notions regarding this type of polynomial will be mentioned and then a method of obtaining them will be indicated.

The specialist literature provides tables of irreducible polynomials on the Galois field of 2. These polynomials are represented in condensed form by a series of digits, for example "642 015". Numbering is by the octal system, so that each digit represents three binary elements, each element representing a coefficient of the polynomial. In the example of the polynomial 642 015, the octal-binary-coefficient correspondences of the polynomial are as follows:

| 6 | 4 | 2 | 0 | 1 | 5 |
|---|---|---|---|---|---|
| 1 1 0 | 1 0 0 | 0 1 0 | 0 0 0 | 00 1 | 1 0 1 |
| $x^{17} +x^{16}$ | $+x^{14}$ | $+x^{10}$ | | $+x^3$ | $+x^2 +1$ |

This is therefore a polynomial with a degree of 17, having 7 terms.

Starting from a set of initial values of 17 binary elements which are not all zero ($a_0, a_1, a_2 \ldots a_{16}$), the series generated by the polynomial 642 015 is defined by the equation:

$$a_i = a_{i-1} + a_{i-3} + a_{i-7} + a_{i-14} + a_{i-15} + a_{i-17}$$
modulo 2 for $i \geq 1$.

The series thus obtained is periodic and has a maximum length of $2^{17}-1$, and we then say that the generating polynomial is primitive. If $\alpha$ denotes a root of this polynomial, it can be shown that the set 0, 1, $\alpha$, $\alpha^2$, $\alpha^3$ ..., $\alpha(2^{17}-2)$ has the structure of a body: this is the body provided with the laws of addition by OR-exclusive and multiplication modulo the Galois polynomial of extension $CG(2^{17})$.

To illustrate the manner of using such polynomials, let us take the example of the polynomial 642 015. It can be obtained using 17 D-type flipflops and 6 "OR-exclusive" gates, connected as shown in FIG. 3, where the flipflops have reference numeral 50 and the gates have reference numeral 52. The interface with the outside comprises 4 connections: an input 54, an output 56, a timing connection 58 and a return to zero 60. To these should be added a supply connection and an earth (not shown).

The minimum time interval $t_{min}$ between two timing strokes is connected to the delay imposed on the propagation of the signal in the gates and flipflops. In the circuit in FIG. 3, we have $t_{min} = 3$ gate delays and 1 flipflop delay.

As a guide, with circuits of the type Ser. No. 74273 used to form the eight flipflops D, the delay obtained is 23 ns, and with Ser. No. 7486 circuits used to form the four OR-exclusive gates, the delay obtained is 40 ns. The maximum timing frequency is thus about 7 MHz.

The circuit in FIG. 3 operates as follows. A "return to zero" order is first of all emitted to impose a known state; then the circuit is initialised, comprising n binary elements on the input connection 54 in synchronism with n timing signals on the timing connection 58. The generator is then ready to operate. It delivers a binary element each time it receives a new timing signal.

To increase the complexity of the series obtained and thus reinforce the generator, several polynomials may be combined in the following manner:

Let there be three primitive polynomials T, R and S. These may be, for example, the polynomials:

T: 642 015 (degree t = 17),
R: 3 020 365 (degree r = 19),
S: 21 042 104 211 (degree s = 31).

These polynomials can be combined by a non-linear logical equation, e.g. $(R.\bar{S}) \oplus (S.T)$ where the point corresponds to the operation AND, the bar to the operation NO and the sign $\oplus$ to the operation OR-exclusive.

The period of the series obtained is equal to the lowest common multiple between $(2^t-1)$, $(2^r-1)$ and $(2^s-1)$; in the example envisaged, where the three numbers $(2^{17}-1)$, $(2^{19}-1)$ and $(2^{31}-1)$ are primary, the period is about $1.4 \cdot 10^{17}$.

The complexity of the series obtained is equal to $r(s+1)+st$, with $19.32+31.17 = 1135$.

Thus, whereas a primitive polynomial of degree r has a complexity of r, meaning that any state of the automatic means by which it can be obtained is a linear combination of the r roots of the generating polynomial, hence an element of the field of extension $CG(2^r)$, the complexity of the set $R.\bar{S} \oplus ST$ is $r(s+1)+st$, in other words every state of the automatic means thus formed is an element of the field of extension $CG(2^{r(s+1)+st})$ and the equivalent minimum linear automatic means has $r(s+1)+st$ flipflops D.

Concerning these properties of combinations of polynomials, reference can be made to the article by Edwin L. KEY entitled: "Structure and Complexity of non-linear binary Sequence Generators" published in the review I.EEE IT 22, No. 6, November 1976, pages 732 to 736.

Figure 4:
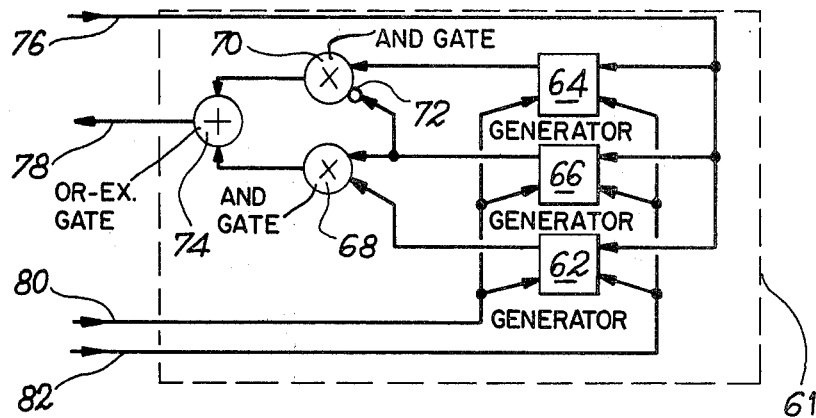
FIG. 4 shows a pseudo-random series generator consisting of a combination of three circuits of the type shown in the previous figure.

The combination of polynomials in question is obtained using the circuit 61 in FIG. 4. In this figure, the circuit 62 generates the polynomial T, the circuit 64 generates the polynomial R and the circuit 66 generates the polynomial S. The gates 68 and 70 are AND gates, the second being connected to the circuit 66 by a reversing gate 72; the gate 74 is an OR-exclusive gate. The entire circuit comprises an input 76, an output 78, a timing connection 80 and a return to zero connection 82.

Now that this particular means of generating a pseudo-random series has been described, the generator of encoding (or decoding) octets which uses this means can be described.

Figure 5:
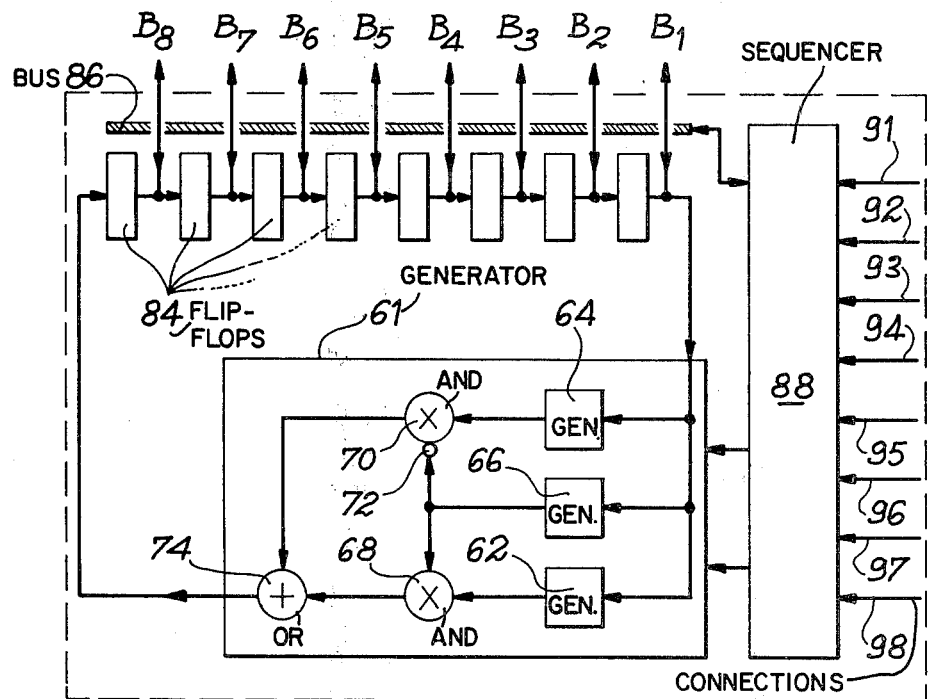
FIG. 5 shows a synoptic plan of a generator of encoding octets or decoding octets.

The structure of a generator of this kind is schematically shown in FIG. 5. It comprises essentially a pseudo-random series generator 61 as described above with reference to FIG. 4, a set of eight D-type flipflops 84, connected to a bus 86, and a sequencer 88 also connected to the bus 86 and to the generator 61, which controls the timing signals and the inputs-outputs of the circuit. The interface with the outside is made up of 16 connections, respectively:

of selection 91, reading 92, writing 93 and return to zero 94, as regards the control, of timing 95, coding/decoding 96, supply 97 and earth 98, as regards the operation, and eight data connections $B_1$ to $B_8$, for the inputs/outputs.

Before explaining the functioning of this circuit, we should point out the difference that exists between the encoding octets used in the emitting centre and the decoding octets used in the receiving stations.

On emission, the encoding octets are even-numbered octets belonging to columns 0 and 1 of the table given above ($c_6 = c_7 = 0$). Thus, the parity of the coded octets is the same as that of the clear octets and we know that these octets are odd-numbered.

On reception, the binary element of imparity of the octets received is verified, then replaced by a validating binary element. Also, the decoding octets comprise a binary element of high weight which is forced to zero ($c_8 = 0$), thus distinguishing them from the encoding octets which have an even-numbered 8th binary element.

Under these conditions, the operation of the circuit in FIG. 5 is as follows. This circuit may receive three orders:

"return to zero",
"read", and
"write".

(a) The order "return to zero" is manifested by the return to zero of the 75 flipflops which the circuit contains (8 flipflops 84, 17 flipflops in the generator 62, 9 in the generator 64 and 31 in the generator 66). This order makes it possible to return the automatic means to a known state;

(b) The order "read" is manifested by the fact that the data on the bus 86 is taken into account in order to initialise the eight flipflops 84 of the interface. These data are transmitted to the three generators 62, 64 and 66 by eight timing signals, thus producing eight new binary elements. These eight new binary elements are used as follows:

the first five position the first five flipflops 84 of the interface, the last three are "forgotten", the 6th and 7th flipflops are forced to zero, the 8th flipflop imposes the correct parity if the apparatus is in the "encoding" position, and is forced to zero if it is in the "decoding" position, for reasons given above.

(c) The order "write" is manifested by the displaying, on the bus, of the states of the eight flipflops 84. These eight flipflops are then returned to zero and eight timing signals make it possible to create eight new binary elements used as for the order "read".

Initialisation of the octet generator is effected by means of the operating key (which is made up of 64 binary elements, i.e. 8 octets marked $k_1$ to $k_8$) from the line number (which varies from 1 to 24 and is coded on two octets marked $NR_1$ and $NR_2$) and from the page number (which varies from 001 to 999 and is coded on three octets marked $NP_1$, $NP_2$ and $NP_3$).

This initialisation of the octet generator is carried out at the beginning of each line of information, using 8 particular octets obtained from the eight octets which define the operating key and the five octets defining the page number and line number.

These eight octets are, for example:
$k_1 \oplus NR_1$, $k_2 \oplus NR_2$, $k_3 \oplus NP_1$, $k_4 \oplus NP_2$, $k_5 \oplus NP_3$, $k_6 \oplus NP_3$, $k_7 \oplus NR_1$, $k_8 \oplus NR_2$.

Thus, at the start of each line of information, the octet generator undergoes the following operations:
return to zero,
read ($k_1 \oplus NR_1$),
read ($k_2 \oplus NR_2$),
read ($k_3 \oplus NP_1$),
read ($k_4 \oplus NP_2$),
read ($k_5 \oplus NP_3$),
read ($k_6 \oplus NP_3$),
read ($k_7 \oplus NR_1$),
read ($k_8 \oplus NR_2$).

Then for each octet in the line, the order is given to the generator to write a new octet. It is essential to generate an encoding octet systematically for each data octet, in order to maintain synchronisation in spite of transmission errors.

Using $d_1, d_2, d_3 \ldots$ to denote the clear octets of a row, $C_1, C_2, C_3$ to denote the encoding octets delivered by the generator, and $D_1, D_2, D_3 \ldots$ to denote the encoded octets, we have the following table of the series of codes:

| | |
|---|---|
| Clear octets: | US $NR_1$ $NR_2$ $d_1$ $d_2$ $d_3$ $d_4$ $d_5$ $d_6$ $d_7 \ldots$ |
| Encoding octets: | $C_1$ $C_2$ $C_3$ $C_4$ $C_5$ $C_6$ $C_7 \ldots$ |
| Encoded octets: | US $NR_1$ $NR_2$ $D_1$ $D_2$ $D_3$ $D_4$ $D_5$ $D_6$ $D_7 \ldots$ |
| with $D_i =$ | $\begin{cases} d_i, \text{ if } d_i \text{ belongs to columns 0 or 1,} \\ d_i \oplus C_i \text{ if } d_i \text{ belongs to columns 2 to 7.} \end{cases}$ |

The table of the series of codes encountered on decoding would be analogous with permutation of the lines of clear octets and coded octets.

Now that the generator of coding or decoding octets has been described, we will now discuss the principle of the automatic encryption means which uses this generator. The structure of this automatic means is illustrated in FIG. 2 described above. Its method of operation is as follows.

From circuit 10 the automatic encryption means receives a series of octets which modify its situation each time. This situation is defined by three parameters which depend, respectively, on the page number received (varying from 001 to 999), the line number (from 00 to 24) and its "state", which may take six different forms:

State 0: the automatic means are waiting for the start of a page;

State 1: the automatic means are taking in and recording the page number ($NP_1 NP_2 NP_3$);

State 2: the automatic means are waiting for the beginning of a line;

State 3: the automatic means are taking in and recording the line number ($NR_1 NR_2$);

State 4: the automatic means are encoding the line of information after having reinitialised the octet generator;

State 5: the automatic means are letting the zero line pass (the role of this zero line will be analysed hereinafter).

Figure 6:
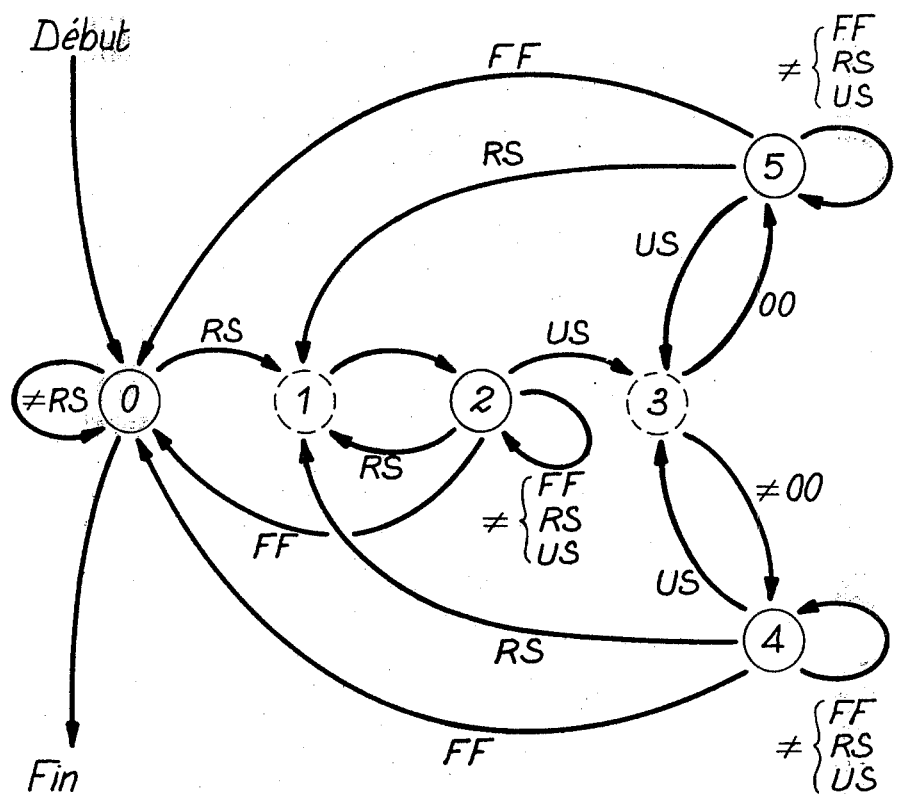
FIG. 6 shows a diagram illustrating the different states which an automatic encrypting means can assume.

FIG. 6 shows the evolution of the automatic means as a function of the nature of the octets which it receives. The notations FF, RS and US have already been defined. The different states of the automatic means are represented by circled figures corresponding to the previous list (states 1 and 3 are shown by broken lines to distinguish them from the others, as these are passive states). At the start of the file, the automatic means is in state 0 (on the left of the diagram). If the octet received is different from RS, the means stay in this state 0. Hence the arrow starting from the circled 0 and returning to it. When the octet received is an RS octet (corresponding to a page flag), the automatic means passes into state 1 and lets in the line number, recording it as the same time; then it passes to state 2, in which it waits for the start of a line, and so on.

Finally, the only state in which the automatic means carries out a coding operation is state 4, in which it processes a line of data from a page accessible by dialling.

Entering state 4, the automatic encryption means reinitialises the generator of encoding octets by 9 successive orders: an order "return to zero", followed by 8 "read" orders, as has just been described. Then the automatic encryption means generates a new encoding octet C for each new clear octet d. If the clear octet has not got its 6th and 7th binary elements at zero, the automatic means remains in state 4 and locks this octet by d⊕C, then goes on to a new octet. If the clear octet d is a control octet ($b_6=b_7=0$), there are four cases:

the clear octet is a "US" (line flag): the automatic means passes to state 3;

the clear octet is an "FF" (end of page): the automatic means passes to state 0;

the clear octet is an "RS" (page flag): the automatic means passes to state 1;

the clear octet is not "US" or "FF" or "RS": the automatic means stays in state 4.

In any case, in these instances, the clear octet is transmitted as it is and the automatic means goes on to a new octet.

Now that the means for encryption and decryption the data which are the primary object of this invention have been described, there follows a description of the means for controlling access to the information, which, in conjunction with the first means, constitute the second object of the invention.

Figure 7:
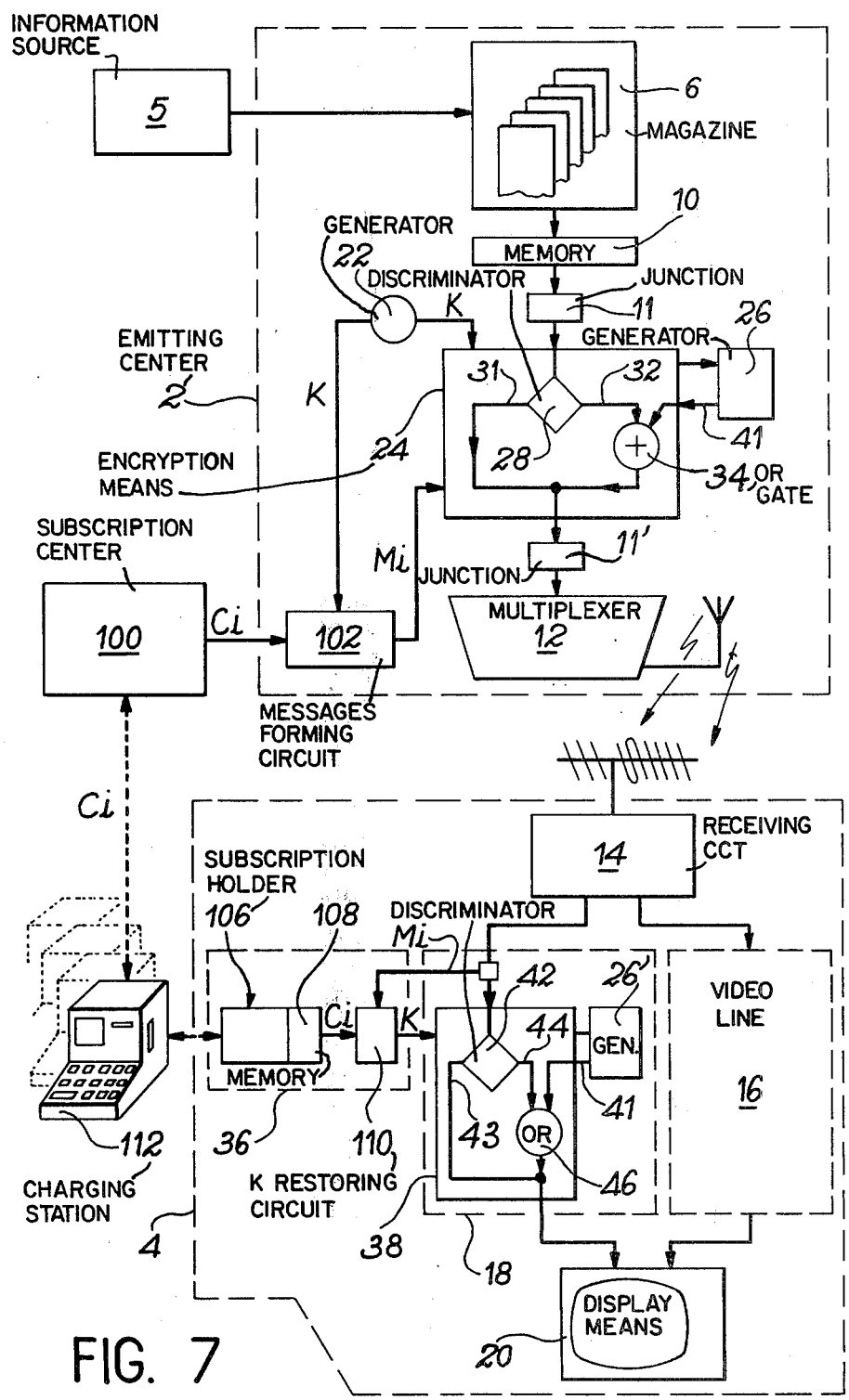
FIG. 7 shows a synoptic plan of a system provided with access control means operating by means of subscribers' keys.

FIG. 7 shows a synoptic plan of the information system provided with these access control means. As shown, this system comprises, in addition to the elements already described with reference to FIG. 2:

(A) a subscription administration centre 100 which generates numerical signals corresponding to the subscribers' keys $C_i$, these keys changing randomly at long intervals of the order of a month, according to plans similar to that described above by way of an example;

(B) in the emitting centre:

a circuit 102 for forming messages $M_i$, which receives from the circuit 100 the signals corresponding to said subscribers' keys $C_i$ and, from the generator 22, the signal corresponding to the operating key K. These messages are obtained by means of an algorithm $F_{C_i}(K)$ the parameters of which are provided by the $C_i$, which will be explained hereinafter. The circuit 102 delivers as many messages $M_i$ as there are subscribers' keys $C_i$, these messages changing with the operating key K. All these messages are organised into a special page 104 known as the access control page. This page is transmitted cyclically by the multiplexer 12, but is not displayable; its structure is indicated hereinafter; C) in each receiving station:

(i) a subscription holder 106 which contains a memory 108 in which is recorded at least one subscription block representing one of the subscribers' keys $C_i$, (j) a circuit 110 for restoring the operating key K, connected on the one hand to the numerical signal decoder of circuit 14 from which it receives all the messages $M_i$ constituting the access control page, and on the other hand, to the memory 108 of the subscription holder from which it receives the subscribers' key $C_i$. This circuit 110 develops an algorithm $K=G_{C_i}(M_i)$ for restoring the signal corresponding to the operating key K used in the emitting station; this algorithm will be explained hereinafter;

(D) at least one charging station 112 connected to the subscription administration centre 100, from which it receives the signals corresponding to the different subscribers' keys $C_i$ generated by this centre; each of these stations is capable of temporarily receiving subscription holders and recording in their memories 108 one of the subscribers' keys $C_i$.

There follows a description of the manner in which the access control page is composed, from the subscribers' keys $C_i$ and the operating key K. To do this, we shall first describe the structure of the numerical signals representing the subscribers' keys, then the algorithm for calculating the messages will be explained and finally we shall give the constitution of the access control page.

The subscribers' keys are generated in the subscription administration centre 100 which provides the emitting centres 2 and the card charging stations 112 with lists.

More precisely, the subscription administration centre supplies:

to the emitting centre:

the subscribers' keys in use for the services involved, and the usage information regarding the service life which the operating key K is to have;

to the card charging stations: the subscription blocks for sale for the services involved, and the prices to be applied.

A subscription block consists of four areas, for example:

(1) an "operating code" of 16 binary elements which denotes the service in question, (2) a "subscription index" of 8 binary elements which characterises a subscription for a service in question. Two of these binary elements indicate the type of subscription (1, 3, 6 or 12 months) and the other six indicate the month in which the subscription starts (1 to 60 modulo 5 years), (3) a "subscribers' key" of 128 binary elements, which is the fundamental information of the block.

(4) a "cyclical redundancy code" of 16 binary elements. This code relates to the preceding 152 binary elements and makes it possible to check the subscription block before using it.

A subscription block is therefore made up of 168 binary elements, or 21 octets. A block of this kind can easily be recorded in a holder of the "credit card" type which would have a PROM memory (Programmable Read Only Memory) with a capacity of 4096 binary elements which can be used for this purpose. A card of this kind could accumulate up to 24 subscription blocks having the above characteristics.

Calculation of the messages from the subscribers' keys $C_i$ and the key K is effected in the emitting centre by the circuit 102 which is organised round a microprocessor. This circuit is programmed to implement an algorithm which is based on two Galois bodies having the Mersenne primary numbers $2^{61}-1$ and $2^{127}-1$ as their characteristics. This algorithm uses the subscribers' keys $C_i$ (127 binary elements) and the operating key K (56 binary elements), in the following way:

(1) A confusion redundancy word $\pi$ is formed, comprising 61 binary elements generated at random each time the algorithm is used;

(2) $\pi^{-1}$, the inverse of $\pi$ modulo $2^{61}-1$, is calculated by an arithmetical programme using a variant of Euclid's algorithm;

(3) a first multiplication is carried out by another arithmetical programme: $\nu = K.\pi^{-1}$ modulo $(2^{61}-1)$;

(4) $\gamma$, the inverse of C modulo $2^{127}-1$, is calculated by a programme similar to that in (2);

(5) finally, the message is calculated by a programme similar to (3): $M = \gamma \cdot (\nu = 2^{64} \cdot \pi)$ modulo $(2^{127}-1)$.

The programmes required for these calculations may be developed by a microprocessor of type 8080 made by INTEL.

The structure of the access control page which puts these messages together is as follows:

```
...    (ETX)   FF RS NP₁ NP₂ NP₃
                US O O C₁ C₂ C₃ C₄ (heading block)
        RC     LF US NR₁ NR₂ (access block)
        RC     LF US NR₁' NR₂' (access block)
        ----------------
        RC     LF US NR₁ⁱ NR₂ⁱ (access block) ETX (FF).
```

The codes which open the page have already been defined. The zero line (US 00) starts with three supplementary codes $C_1$, $C_2$ and $C_3$ conventionally intended to permit the insertion of functional pages in the magazines.

To indicate that this particular page is an operating page which should not be displayed, the 4th binary element of $C_2$ is at 1. A 4th supplementary code octet $C_4$ is used with $b_1 = b_2 = b_3 = b_4 = 1$ to identify the access control page.

This page is modified each time K, the operating key, is changed. To signal this event, the 4th binary element of $C_1$ is used, which is traditionally used to indicate a new updating operation and which is brought to 1 for a period of time immediately following this updating.

The zero line is continued by a heading block which comprises the operating code (16 binary elements), the current month (6 binary elements) and a cyclical redundancy code of 16 binary elements.

Then come the different lines of the access control page. These lines start with a line number followed by an access block, and there are as many access blocks (hence lines) as there are subscription blocks. The numbering of these rows may advantageously be as follows.

As explained above, for a given service, a subscription block is characterised by a subscription index which is made up of a code with 8 binary elements. Similarly, it has been pointed out that, at a given moment, there could be 22 subscription blocks in use, if the subscription plan indicated above is used for 24 available lines.

Now, a line number extends over 2 octets each having 4 useful binary elements (the other four constitute a Hamming code), i.e. a total of 8 binary elements. Consequently, it is possible to take the subscription index as the line number in the access control page.

Consequently, in an advantageous embodiment, the number of a line of the access control page gives the subscription index to which the following access block relates.

As for these access blocks, they are made up of two areas:

(1) a message of 127 useful binary elements plus 1 binary element at zero, (2) a cyclical redundancy code of 16 binary elements.

An access block therefore comprises 144 useful binary elements which extend over 24 octets, at a rate of 6 useful binary elements, completed by $b_7 = 1$ and $b_8$ in imparity.

After this description of the general organisation of the system of the invention, there follows a more detailed description of the particular means which have to be inserted in the emitting centre and receiving stations in order to be able to control access to the information effectively, according to the process described above. First, we shall discuss the means provided in the emitting centre and then move on to those in the receiving stations.

Figure 8:
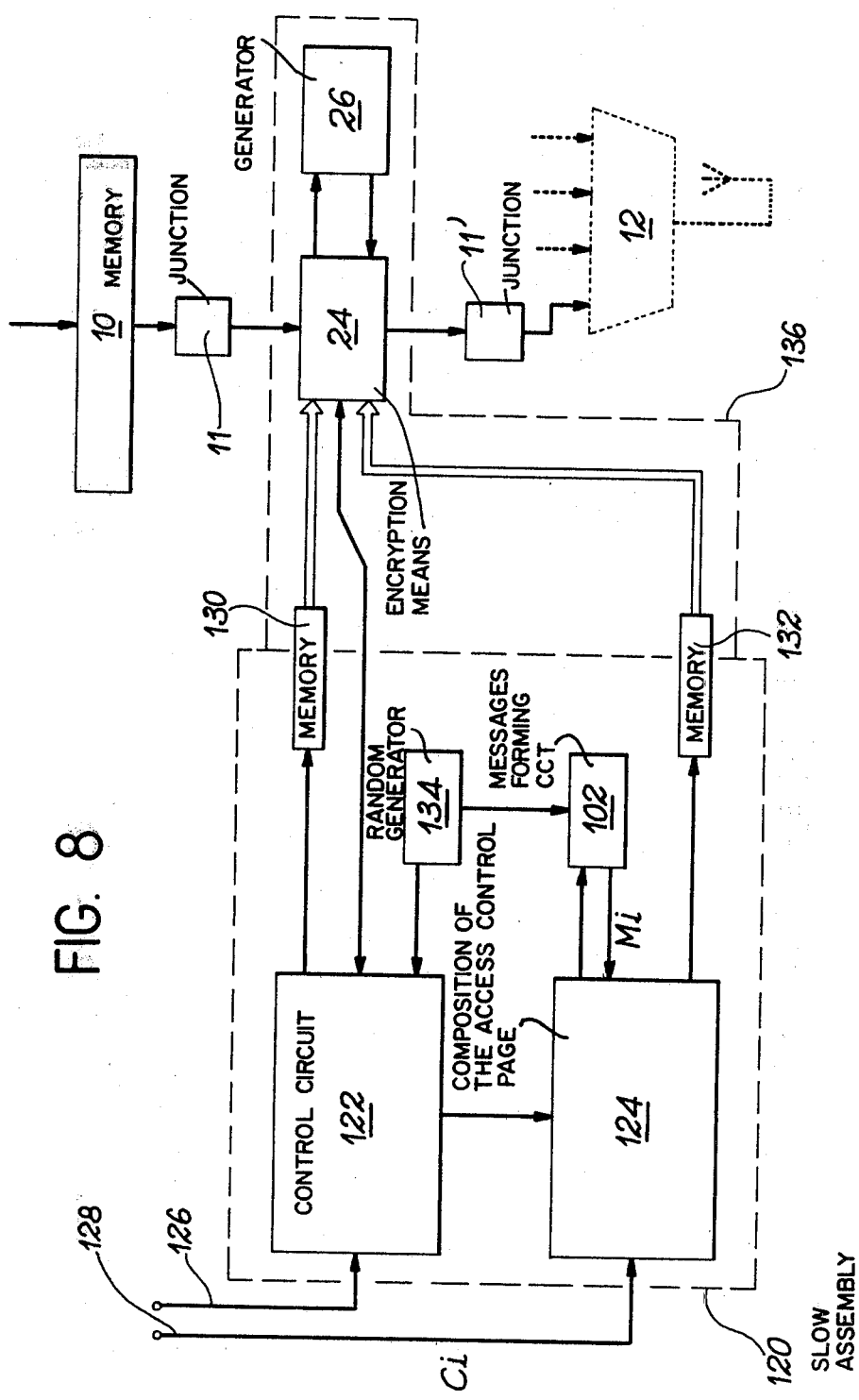
FIG. 8 shows the means used in the distribution centre for encryption the information.

In the emitting centre, these means are inserted between the distribution source (circuit 10 in FIG. 2) and the emitting circuit (multiplexer 12 in this same FIG. 2), with two junctions 11 and 11' framing them. These means are illustrated in detail in FIG. 8. The circuit shown in this figure comprises two assemblies:

(1) a slow assembly 120 (consisting in practice of a suitably programmed and interfaced microprocessor) which comprises a circuit 122 which provides the control and running of the timers (duration of the operating key K, decision to insert the access control pages) and a circuit 124, for the composition of the access control page, this circuit receiving the message Mi from the circuit 102 mentioned above. The circuits 122 and 102 are connected to a random generator 134. The operator provides this assembly 120 with the hourly use signals by means of a connection 126 and the subscription blocks in use at the start of each session of the service in question, by means of a connection 128. This slow assembly is interfaced by two memories: the memory 130 which contains K, the operating key, and the memory 132 which contains the access control page. Control connections (not shown) make it possible to carry the orders: locking-stop, insertion of the access control page, reading of K, clearing at the end of the magazine page, clearing at the end of the access control page and, of course, return to zero.

(2) A fast assembly 134 (consisting of a cabled logic permitting rates of the order of 20 k octets/second) which comprises the automatic locking means 24 described above and the generator of encoding octets 26 whose structure and operating were described earlier with reference to FIG. 5.

The advantage of the assembly described is that the user is in control of the service life of the operating key K and of the moments for inserting the access control page in the locked magazine.

Before coming on to the means to be inserted in each receiving station to permit access to the information, the structure of this receiver should be explained; this structure was only outlined in FIGS. 1 and 2.

Figure 9:
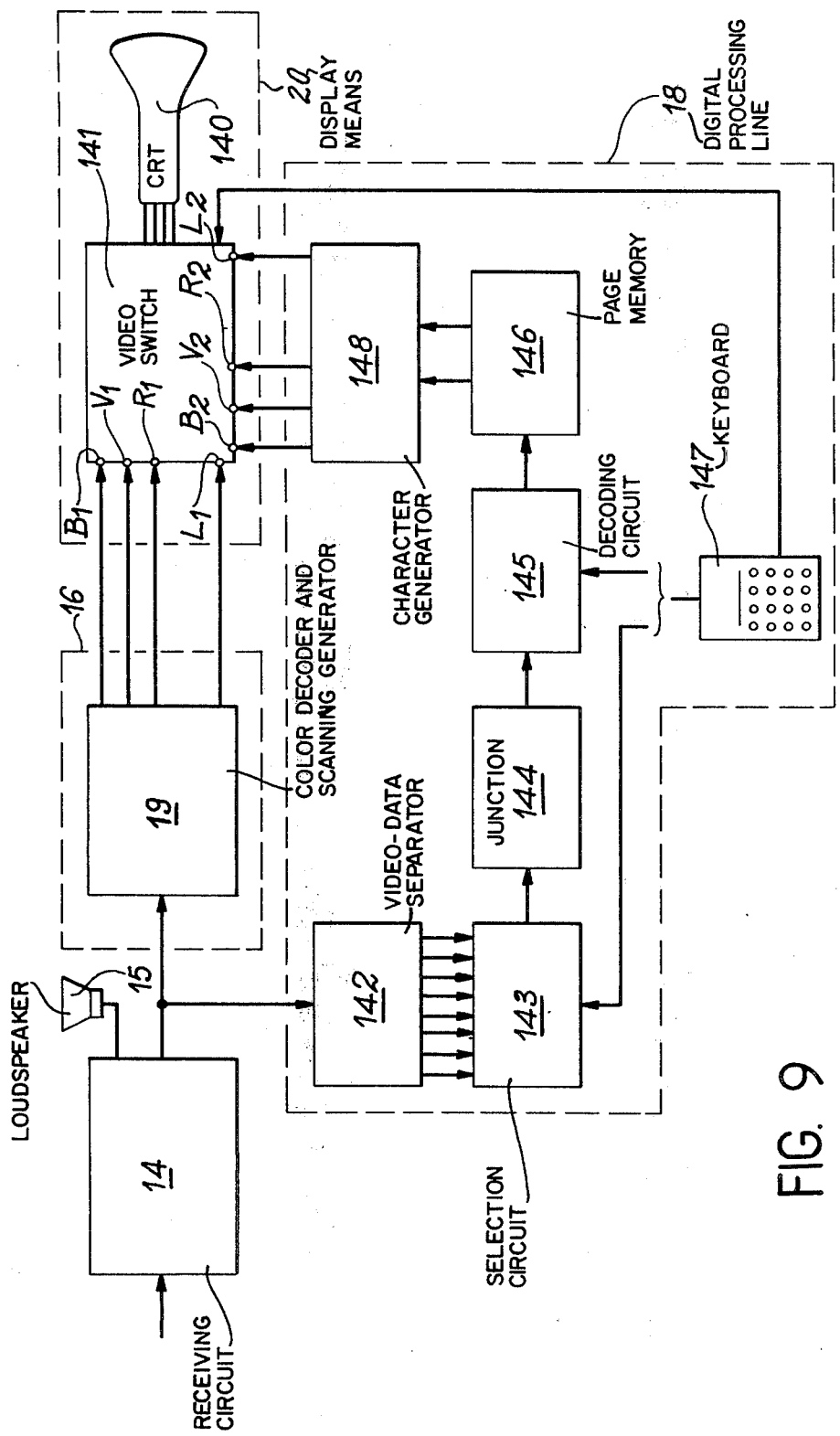
FIG. 9 shows a synoptic plan of a receiver according to the prior art.

This structure is shown in FIG. 9.

The receiver illustrated in FIG. 9 comprises the large functional blocks already mentioned with regard to FIGS. 1 and 2, namely: a receiving and demodulating circuit 14, a line 16 for processing picture signals, a line 18 for processing numerical signals and display means 20. The circuit 14 delivers, on the one hand, the sound to a loudspeaker 15 and, on the other hand, the video signal to a colour decoder and scanning generator 19.

The colour signals $B_1$, $V_1$ and $R_1$, and the luminance $L_1$ from the circuit 19 are transmitted to the tube 140 through a video switch 141.

The receiving station shown comprises, in the line 18 for processing numerical signals, a video-data separator 142 (which operates by a known procedure to extract a series of octets from the analog signal) the input of which is connected to the video output of the circuit 14. This separator has its output connected to a primary selection circuit 143 (which also operates by a known procedure so as to extract the octets carried in a numerical line). The output of the circuit 143 is connected by a junction 144 to a page selecting and data decoding circuit 145 whose output is connected to the input of a page memory 146. A subscribers' keyboard 147 is connected to the control inputs of blocks 143 and 145 and to the switch 141. The output of the memory 146 is connected to the input of a character generator 148. The signal outputs of the generator 148 are connected to the colour inputs $R_2$, $V_2$ and $B_2$ of the video switch 141 and to a luminance input $L_2$.

As the operation of this circuit is known, it will not be restated here. It should simply be remembered that at the output from the analog circuit 142, the data are octets structured in bundles enveloped by a procedure of eight heading octets, three of which are line number octets. The numerical circuit 143 selects a numerical line, i.e. it lets through the useful data of the selected bundles, according to their line number.

The junction 144 does not play an essential part in the system of the invention, but is primarily useful in facilitating physical separation at the transport level and at the operating level.

Page selection and the decoding of the selected pages are carried out in the circuit 145. This assembly decodes a page of data, line by line, and fills the page memory 146. This memory may have a capacity of 1001 words of 16 binary elements (25 lines of 40 characters plus one control word), each character being coded on 16 binary elements in display form.

Having outlined this, we can tackle the question of the modifications to be made to this receiver to enable the access control to be carried out.

With the electronic lock according to the invention being attached at the operating level, as emphasised hereinbefore, it has no effect on the procedure. Thus, the operation of circuits 142 and 143 is not modified in any way. Therefore, data structured in pages which are themselves arranged in lines always pass through the junction 144. Among these pages, there are always functional pages which are accessible by supplementary codes, and pages of information, which are accessible by dialling with the keyboard 147.

However, among these functional pages, a new variety has been introduced on emission for control purposes: this is the access control page, whose structure is described hereinbefore. Moreover, according to the invention, the pages of information are locked up line by line, apart from the zero line which is regarded as an integral part of the procedure. The circuit 145 therefore has to be completed in order to take these two new elements into account.

The necessary supplements are of two kinds:

(1) At the level of decoding the pages of information: the decoder should unlock the information line by line, using an octet generator similar to that used on emission;

(2) At the level of processing the functional pages: the decoder should know the method of using the access control pages and should also be able to hold a dialogue with a subscription card in order to obtain K, the operating key.

Figure 10:
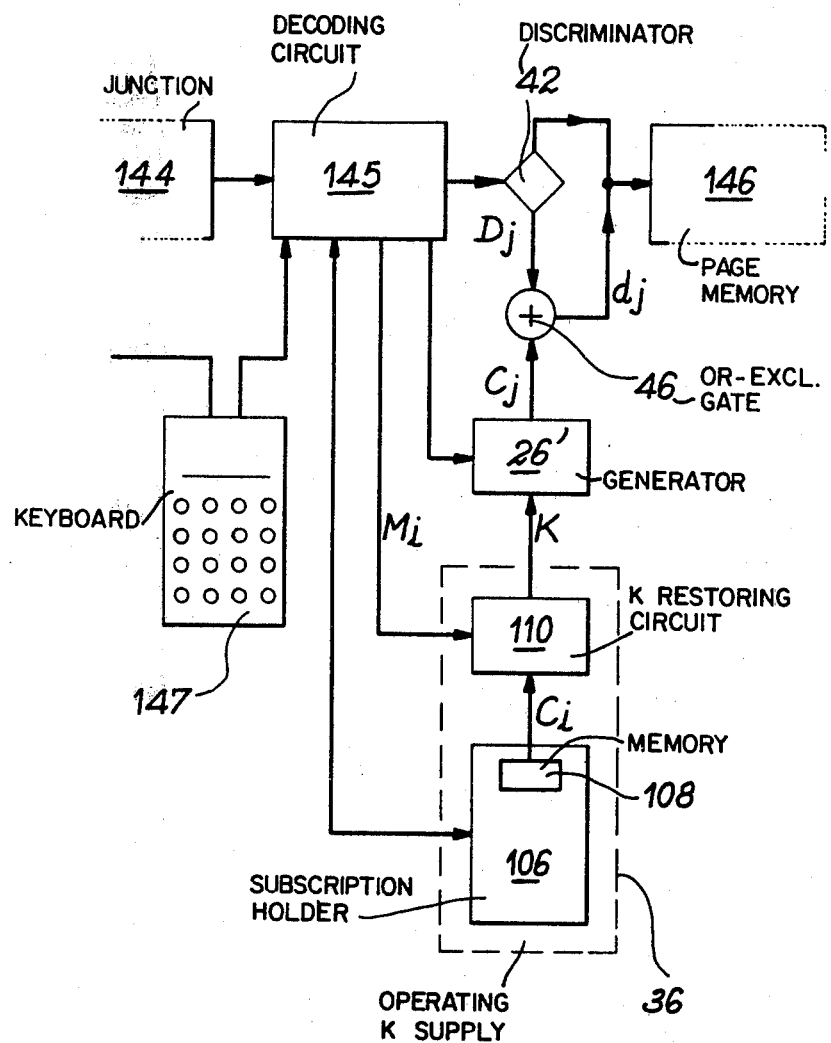
FIG. 10 shows a synoptic plan of the means to be inserted in the receiver of the type shown in the previous figure, in order to decrypt the information.

These supplements comprise both logical means to supplement the logical means already existing in the circuit 145, and specialised means. The latter is shown in FIG. 10. It consists of the generator of decoding octets 26' (which is analogous to the generator 26 in FIG. 5), the subscription card 106, the circuit 110 for restoring the key K from $M_i$ and $C_i$, the comparator 42 for distinguishing the octets belonging to columns 0 and 1, which are interpreted directly to form the memory 146, the octets of columns 2 to 7 which pass through the OR-exclusive gate 46, before being interpreted and directed towards the memory 146.

At the level of the logical means, the decoding of pages of information by the circuit 145 does not present any particular problems, as, in its conventional design (described in the abovementioned patent application), this circuit already has a knowledge of the page and line numbers. It even has a knowledge of the zero line because it analyses the supplementary codes therein. The page number is used for it to select the page, whilst it uses the line number to position a pointer in the page memory 146.

In the present invention, in the presence of a new line of information, the decoder 145 initialises the generator of decoding octets 26' according to the process indicated above with reference to FIG. 5, which uses nine successive orders.

Then, for each octet in the line, the decoder 145 causes the generation of a decoding octet $C_j$ ($c_6 = c_7 = c_8 = 0$), and if the octet $D_j$ received is not a control code (columns 0 and 1), which is verified by the comparator 42, the decoder combines it, by "OR-exclusive", with the decoding octet in the gate 46.

At the level of processing the functional pages, the circuit 145 has programmes permitting analysis and use of the access control pages. At the appropriate address in the memory 108 of the card 106, the circuit locates a valid subscription block from which it extracts the subscription index. Then, in the access page, it searches for the line corresponding to this subscription index (since, as has been seen, the lines are numbered by the indices). There, it recovers the access block and extracts the message $M_i$ from it. This message is transmitted to the circuit 110 which calculates the key K using the subscribers' key $C_i$ appearing in the subscription block which has just been located in the card.

To restore this key K from $M_i$ and $C_i$, the circuit 110 (which may be an integral part of the card and constitute the holder 36) is programmed to develop an algorithm $K = G_{C_i}(M_i)$ which, as on emission, is a double body algorithm. The operations are as follows:

(1) The message $M_i$ (127 useful binary elements) is taken octet by octet and multiplication by $C_i$ is carried out on the first field CG ($2^{127} - 1$). In this way a word $\mu$ is formed:

$$\mu = M \cdot C \text{ modulo } (2^{127} - 1)$$

According to the construction of M on emission, the binary elements 1 to 61 of $\mu$ represent the word $\nu$, whilst the binary elements 65 to 125 represent the word $\pi$. Of course, the binary elements 62, 63, 64, 126 and 127 should be zero. If not, the word $\nu$ is set to zero before continuing the calculation.

(2) $\pi$ and $\nu$ are multiplied on the second field $CG(2^{61}-1)$, thus eliminating the confusion redundancy, and we obtain $$K = \nu \cdot \pi \text{ modulo } (2^{61}-1).$$

A new probability test is used here because, as K has 56 useful binary elements, the elements 57, 58, 59, 60 and 61 should be zero. If they are not, K is set to zero before continuing the operation.

(3) The 56 useful binary elements of K are then available in the form of eight odd-numbered octets.

The foregoing description relates to a system wherein the information is transmitted by a procedure in the lines of a television signal. However, it goes without saying that the invention is more general, as it does not presuppose a particular method of transporting the information, since, as emphasised hereinbefore, the encryption operation is carried out at the operating level and not at the transporting level.

It also goes without saying that the disclosed broadcasting system is used only by way of an example and that the invention could be applied to other systems without any difficulty for the man skilled in the art, and notably to the CEEFAX or ORACLE systems or the VIEWDATA or PRESTEL systems.

The invention is not limited to the embodiments described and represented hereinbefore and various modifications can be made thereto without passing beyond the scope of the invention.

What is claimed is:

1. A text video-transmission system comprising an information emitting center and receiving stations, the emitting center comprising:

means for composing a magazine consisting of pages organized into lines of characters, if such means are not already contained in the information source, a circuit for memorizing the magazine in the form of numerical signals grouped in octets (8 binary elements), these octets comprising control octets and data octets, the control octets indicating in particular the beginnings and ends of pages and the beginnings and ends of lines, the data octets corresponding to characters contained in each line, all these control and data octets comprising a binary element of high weight which is an odd-numbered element, the octets wherein the 6th and 7th binary elements are zero being the control octets, a junction connected to the circuit, and a distribution multiplexer serving to insert the information in the lines of a television signal, this emitting center further comprising encryption means for encoding the information using an operating key, each receiving station comprising:

a circuit for receiving and demodulating said television signal, a line for processing the video picture signals, a line for processing the numerical signals, containing in particular a numerical signal decoder, and display means, each receiving station further comprising decryption means for decoding the encrypted information and using said operating key, wherein, in this system:

(A) the encryption means of the emitting center comprise:

(a) a generator 22 delivering a numerical signal representing an operating key K, this key changing randomly at predetermined intervals, (b) automatic encryption means 24 comprising:

(i) a discriminator with an input connected to the magazine memorizing circuit from which it receives clear octets, this discriminator being capable of distinguishing, among these clear octets, those wherein the 7th and 6th binary elements are zero, this discriminator having two outputs, the first carrying these octets wherein the 7th and 6th binary elements are zero and connected to the distribution multiplexer via the junction, and the second carrying the clear octets $d_j$ wherein the 7th and/or 6th binary elements are not zero, (ii) an OR-exclusive logic circuit with two inputs, one of which is connected to the second output of the discriminator from which it receives the clear octets $d_j$ wherein the 6th and/or 7th binary elements are not zero, this logic circuit having an output which carries odd-numbered encrypted octets $D_j$, the encrypted octets then being directed toward the distribution multiplexer via the junction;

(c) a generator of encoding octets controlled by the automatic encryption means from which it receives octets indicating the page and line numbers of the data to be transmitted and the signal corresponding to the operating key, this octet generator delivering, for each data octet $d_j$ of a displayable line, an encoding octet $C_j$, this octet having an even-numbered 8th binary element and having 7th and 6th binary elements of zero, this octet being applied to the other input of the logic circuit, (B) the decryption means of each receiving station comprise:

(d) a generator of a numerical signal representing the operating key K in use in the emitting center, (e) an automatic decryption means comprising:

(i) a discriminator with an input connected to the numerical signal decoder of the receiving station from which it receives the coded octets, this discriminator being adapted to distinguish, among these coded octets, those wherein the 7th and 6th binary elements are zero, this discriminator having two outputs, the first carrying these octets wherein the 7th and 6th binary elements are zero, this first output being directly connected to the display means, the second carrying the coded octets $D_j$ wherein the 7th and/or 6th binary elements are not zero, (ii) an OR-exclusive logic circuit with two inputs, one connected to the second output of the discriminator from which it receives the encrypted octets $D_j$, this logic circuit having an output which carries decrypted octets $d_j$ which are then directed towards the display means;

(f) a generator of decoding octets controlled by the automatic decryption means which transmits to it the octets indicating the page and line numbers of the data transmitted and the signal corresponding to the operating key K in use, this generator of decoding octets having an output which delivers, for each coded octet received, a decoding octet $C_j$ having a heavy weight binary element which is forced to zero and 7th and 6th binary elements of zero.

2. A system according to claim 1, wherein the generator of encoding octets of the emitting centre and the generator of decoding octets of the receiving stations each comprise:
   a pseudo-random series generator and means for re-initialising this generator at the beginning of each displayable line, by means of the operating key K and by means of the page and line numbers,
   a circuit adapted to take five binary elements at the output from the pseudo-random generator, these five elements constituting the first five binary elements of the octet, and adapted to add 6th and 7th binary elements which are zero, and an 8th binary element which is an element of parity for the generator of encoding octets and which is forced to zero for the generator of decoding octets.

3. A system according to claim 2, wherein the operating key is made up of eight octets designated $k_1$ to $k_8$, and wherein, with the line number coded on two octets designated $NR_1$ and $NR_2$ and the page number coded on 3 octets designated $NP_1$, $NP_2$ and $NP_3$, the pseudo-random series generator is initialised by eight octets obtained by combining, by means of the OR-exclusive logic function, the eight octets $k_1$ to $k_8$, respectively, with eight octets taken from the octets $NP_1$, $NP_2$, $NP_3$, $NR_1$ and $NR_2$, these combinations being: $k_1 \oplus NR_1$, $k_2 \oplus NR_2$, $k_3 \oplus NP_1$, $k_4 \oplus NP_2$, $k_5 \oplus NP_3$, $k_6 \oplus NP_3$, $k_7 \oplus NR_1$, $k_8 \oplus NR_2$.

4. A system according to claim 2, wherein the pseudo-random series generator consists of a circuit comprising D-type flipflops in a series, combined with logic gates of the OR-exclusive kind, this circuit having an input connected to a timer and producing a primitive generating polynomial.

5. A system according to claim 4, wherein the pseudo-random series generator consists of a plurality of circuits each producing a primitive generating polynomial, the outputs of these circuits being combined by logic circuits.

6. A system according to claim 1, further comprising:
   (A) a subscription administration centre (100) which generates numerical signals corresponding to subscribers' keys $C_i$, these keys changing randomly at intervals which are long compared with the intervals at which the operating key K is changed,
   (B) in the emitting centre:
   a circuit (102) for combining the signals corresponding to said subscribers' keys $C_i$ and the signal corresponding to the operating key K, this combination being defined by an algorithm $F_{C_i}(K)$ the parameters of which are provided by the subscribers' keys $C_i$, this circuit delivering as many messages $M_i = F_{C_i}(K)$ as there are subscribers' keys $C_i$, these messages changing with the operating key K, all the messages $M_i$ being organised into a special page known as the access control page, transmitted cyclically by the emitting means, but not displayable,
   (C) in each receiving station:
   (i) a subscription holder (106) having a memory (108) containing at least one of the subscribers' keys $C_i$;
   (j) a circuit (110) for restoring the operating key K, receiving all the messages $M_i$ constituting the access control page, on the one hand, and, on the other hand, the subscribers' key $C_i$, this circuit working out an algorithm $K = G_{C_i}(M_i)$ restoring the signal corresponding to the operating key K used in the emitting centre,
   (D) at least one station (112) for charging the subscription holders, this station being connected to the subscription administration centre from which it receives the signals corresponding to the different subscribers' keys $C_i$ generated by this centre, each station being capable of temporarily receiving subscription holders and permanently recording one of the subscribers' keys $C_i$ thereon.

7. A system according to claim 5, wherein the circuit (102) for forming messages $M_i$ by combining the signals corresponding to the subscribers' keys $C_i$ with the signal corresponding to the operating key K comprises means for working out the following algorithm:
   calculating a word $\pi$ of 61 binary elements generated at random,
   calculating the inverse $\pi^{-1}$ of $\pi$, modulo $2^{61} - 1$,
   calculating the word $\nu = K.\pi^{-1}$, modulo $2^{61} - 1$,
   calculating the word $\gamma$ inverse of $C_i$, modulo $2^{127} - 1$,
   finally calculating the word $M_i = \gamma(\nu + 2^{64}\pi)$, modulo $2^{127} - 1$.

8. A system according to claim 7, wherein, in the receiving station, the circuit (110) for restoring the operating key from the messages $M_i$ and the operating key K is capable of working out the following algorithm:
   (a) a message $M_i$ of (127) useful binary elements is taken octet by octet, and multiplication by $C_i$ is carried out to form a word $\mu$:

$$\mu = M \cdot C \text{ modulo } (2^{127} - 1)$$

with the binary elements 1 to 61 of $\mu$ representing a word $\nu$, whilst the binary elements 65 to 125 represent a word $\pi$;
   (b) $\pi$ and $\nu$ are multiplied, modulo $2^{61} - 1$, to give K.

9. A system according to claim 6, which comprises, in the emitting centre, means (124) capable of setting up an access control page with:
   a zero line comprising three supplementary codes $C_1$, $C_2$, $C_3$ indicating that it is a non-displayable operating page, and a fourth supplementary code $C_4$ specifying that it is an access control page,
   lines consisting of a line heading followed by a line number, followed by an access block consisting of a message $M_i$ followed by a cyclic redundancy code.

10. A system according to claim 6, wherein the numerical subscription signals are blocks made up of four areas:
   an operating code,
   a subscription index (on 8 binary elements),
   a subscribers' key,
   a cyclic redundancy code.

11. A system according to claim 9, wherein the subscription index is taken as the number of lines in the access control page.

* * * * *